US012754762B2

(12) United States Patent
Covell et al.

(10) Patent No.: US 12,754,762 B2
(45) Date of Patent: Oct. 6, 2026

(54) MIGRATING DATA BASED ON USER EXPERIENCE AS A SERVICE WHEN DEVELOPING AND DEPLOYING A CLOUD-BASED SOLUTION

(71) Applicant: INTERNATIONAL BUSINESS MACHINES CORPORATION, Armonk, NY (US)

(72) Inventors: Jacob Thomas Covell, New York, NY (US); Jeremy R. Fox, Georgetown, TX (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 566 days.

(21) Appl. No.: 17/655,267

(22) Filed: Mar. 17, 2022

(65) Prior Publication Data

US 2023/0297416 A1 Sep. 21, 2023

(51) Int. Cl.
*G06F 9/455* (2018.01)
*G06F 9/48* (2006.01)
(Continued)

(52) U.S. Cl.
CPC ........ *G06F 9/4875* (2013.01); *G06F 11/3495* (2013.01); *G06N 20/00* (2019.01)

(58) Field of Classification Search
CPC .. G06F 9/4875; G06F 11/3495; G06F 9/5072; G06N 20/00
See application file for complete search history.

(56) References Cited

U.S. PATENT DOCUMENTS 8,868,749 B2 10/2014 Bartfai-Walcott
9,973,380 B1 * 5/2018 Mittal ................. H04L 67/1008
(Continued)

FOREIGN PATENT DOCUMENTS

CN 104010315 B 8/2014
WO 2016165539 A1 10/2016

OTHER PUBLICATIONS

David Nield, "All the Ways Google Tracks You—And How to Stop It", https://www.wired.com/story/google-tracks-you-privacy/, May 27, 2019, 16 pages.

*Primary Examiner* — Pierre Vital
*Assistant Examiner* — Abdou K Seye
(74) *Attorney, Agent, or Firm* — Steven M. Bouknight

(57) ABSTRACT

A computer-implemented method for automatically migrating a cloud-based solution onto a datacenter is provided. The method may include populating and maintaining a corpus of datacenters. The method may further include implementing a machine-learning algorithm to identify different types of users and to generate a user profile for each type of user based on machine-learned user profile data. The method may further include detecting user experience with the cloud-based solution on one or more datacenters from the corpus of datacenters for each type of user based on the machine-learned user experience data. The method may further include correlating the machine-learned user profile data and user experience data with the current and previous computing capabilities and performance of each datacenter in the corpus. The method may also include automatically migrating the cloud-based solution onto the datacenter from the corpus of datacenters for the specific type of user based on the correlation.

17 Claims, 9 Drawing Sheets

(51) Int. Cl.
*G06F 11/34* (2006.01)
*G06N 20/00* (2019.01)

(56) References Cited

U.S. PATENT DOCUMENTS

| | | | | |
|---|---|---|---|---|
| 10,326,832 | B2 | 6/2019 | Fitzpatrick | |
| 10,505,866 | B2 | 12/2019 | Lee | |
| 10,558,503 | B2 | 2/2020 | Deivanayagam | |
| 11,144,340 | B2 | 10/2021 | Warnicke | |
| 2010/0211958 | A1 | 8/2010 | Madison, Jr. | |
| 2013/0219043 | A1* | 8/2013 | Steiner | H04L 43/16 709/224 |
| 2019/0138337 | A1* | 5/2019 | Vegesna | H04L 43/08 |
| 2019/0205172 | A1 | 7/2019 | Arolovitch | |
| 2019/0213104 | A1* | 7/2019 | Qadri | H04L 67/1097 |
| 2019/0303021 | A1 | 10/2019 | Favre-Felix | |
| 2020/0241993 | A1 | 7/2020 | Chen | |
| 2021/0243090 | A1* | 8/2021 | Campbell | G06F 9/547 |
| 2022/0035680 | A1* | 2/2022 | Sharma | G06Q 10/06393 |
| 2022/0138001 | A1* | 5/2022 | Sivaraman | G06F 9/45558 718/1 |
| 2022/0191148 | A1* | 6/2022 | Raindel | G06F 9/45558 |
| 2022/0357869 | A1* | 11/2022 | Salamon | G06F 11/3075 |
| 2023/0177411 | A1* | 6/2023 | Narang | G06F 9/50 705/5 |

* cited by examiner

400

| | | User Profile (System Learned & User Defined) |
|---|---|---|
| Name | 402 | Albert Jones |
| Type of User / User Role | 404 | Developer |
| User Location | 406 | Houston, Texas |
| Preferred Data Center | 408 | Dallas, Texas (DC #12) |
| Typical Activities Performed | 410 | - Development work<br>- Production Deployment<br>- Video Editing |
| Language Preferences | 412 | English |
| Typical Time of Peak Processing Activity | 414 | 7:00 PM |
| Minimum SLA's per activity type: | 416 | |
| Latency requirements per task type | 418 | Development Work --> 5 seconds<br>Video Editing --> 10 seconds |
| Response % | 420 | 99.90% |
| Scheduled Activities | 422 | Large Production Deployment --> 7:00 PM on August 20, 2021 |

FIG. 4

500

Scores given from 0-100:

0 --> Worst

100 --> Best

| Example Factors: | Weight of Factors (Totals 1.00) | Datacenter 118b | Datacenter 118a |
|---|---|---|---|
| Distance from User 502 | 0.1 | 90 | 55 |
| Time of Activity (scheduled) --> Compare to expected peak load time 504 | 0.2 | 75 | 43 |
| Type of User Role --> Compare to Specialized Data Center Processing Capabilities 506 | 0.1 | 63 | 47 |
| Classification of Activity Type--> Compare to Specialized Data Center Processing Capabilities 508 | 0.1 | 44 | 62 |
| Minimum SLA expected/achieved from Data Center vs. Minimum SLA desired from user (i.e. performance requirements, latency, response %, etc.) 510 | 0.3 | 43 | 20 |
| Preferred Data Center Location (if available) 512 | 0.2 | 55 | 33 |
| Score | | 58.6 | 37.6 |
| | | Optimal Data Center | |

FIG. 5

MIGRATING DATA BASED ON USER EXPERIENCE AS A SERVICE WHEN DEVELOPING AND DEPLOYING A CLOUD-BASED SOLUTION

BACKGROUND

The present invention relates generally to the field of computing, and more specifically, to automatically migrating data on datacenters when developing and deploying a cloud-based solution in a cloud computing environment.

Generally, computer resources may be hosted in multiple locations worldwide, and these hosts may often be referred to as datacenters. Specifically, datacenters may be located in different geographical regions and/or zones and may be dedicated to providing resources to different computing devices. In its simplest form, a datacenter may be a physical facility that organizations use to host critical applications and data which may be used by other computing devices and applications based in part on a proximity of a computing device to the geographical location of a datacenter. Accordingly, a datacenter may be designed based on a number of decisions regarding network connections as well as computing and storage resources that enable the delivery of shared resources, applications, and data. Some key components of a datacenter may typically include routers, switches, firewalls, storage systems, servers, and application-delivery controllers. Datacenters are often crucial in playing a role for implementing cloud-based solutions, whereby the term cloud-based solutions may refer to applications, storage, on-demand services, computer networks, or other resources that are accessed with a network connection through a service provider's shared cloud computing framework. Specifically, when an activity such as authoring, coding, developing, and/or deploying any cloud-based solution is executed, a datacenter in a certain region may be selected for hosting the cloud-based solution and/or performing the computing activity.

SUMMARY

A method for automatically migrating a cloud-based solution onto a datacenter based on machine-learned user profile data and user experience data is provided. The method may include populating and maintaining a corpus of datacenters, wherein maintaining the corpus of datacenters further comprises detecting current and previous computing capabilities and performance of each datacenter in the corpus. The method may further include implementing a machine-learning algorithm to identify different types of users and to generate a user profile for each type of user based on the machine-learned user profile data, wherein generating the user profile based on the machine-learned user profile data further comprises identifying computing activities associated with a specific type of user and determining a time in which the specific type of user performs the computing activities. The method may further include using the machine-learning algorithm to detect a user experience with the cloud-based solution on one or more datacenters from the corpus of datacenters for each type of user based on the machine-learned user experience data, wherein detecting the user experience based on the machine-learned user experience data further comprises detecting user actions performed on the cloud-based solution by the specific type of user and the performance of the one or more datacenters during performance of the user actions. The method may further include using the machine-learning algorithm to correlate, for the specific type of user, the machine-learned user profile data with the machine-learned user experience data and the current and previous computing capabilities and performance of each datacenter in the corpus. The method may also include automatically migrating the cloud-based solution onto the datacenter from the corpus of datacenters for the specific type of user based on the correlation between the machine-learned user profile data, the machine-learned user experience data, and the current and previous computing capabilities and performance of the datacenter.

A computer system for automatically migrating a cloud-based solution onto a datacenter based on machine-learned user profile data and user experience data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include populating and maintaining a corpus of datacenters, wherein maintaining the corpus of datacenters further comprises detecting current and previous computing capabilities and performance of each datacenter in the corpus. The method may further include implementing a machine-learning algorithm to identify different types of users and to generate a user profile for each type of user based on the machine-learned user profile data, wherein generating the user profile based on the machine-learned user profile data further comprises identifying computing activities associated with a specific type of user and determining a time in which the specific type of user performs the computing activities. The method may further include using the machine-learning algorithm to detect a user experience with the cloud-based solution on one or more datacenters from the corpus of datacenters for each type of user based on the machine-learned user experience data, wherein detecting the user experience based on the machine-learned user experience data further comprises detecting user actions performed on the cloud-based solution by the specific type of user and the performance of the one or more datacenters during performance of the user actions. The method may further include using the machine-learning algorithm to correlate, for the specific type of user, the machine-learned user profile data with the machine-learned user experience data and the current and previous computing capabilities and performance of each datacenter in the corpus. The method may also include automatically migrating the cloud-based solution onto the datacenter from the corpus of datacenters for the specific type of user based on the correlation between the machine-learned user profile data, the machine-learned user experience data, and the current and previous computing capabilities and performance of the datacenter.

A computer program product for automatically migrating a cloud-based solution onto a datacenter based on machine-learned user profile data and user experience data is provided. The computer program product may include one or more computer-readable storage devices and program instructions stored on at least one of the one or more tangible storage devices, the program instructions executable by a processor. The computer program product may include program instructions to populate and maintain a corpus of datacenters, wherein maintaining the corpus of datacenters further comprises detecting current and previous computing capabilities and performance of each datacenter in the corpus. The computer program product may also include program instructions to implement a machine-learning algorithm to identify different types of users and to generate a user profile for each type of user based on the machine-learned user profile data, wherein generating the user profile based on the machine-learned user profile data further comprises identifying computing activities associated with a specific type of user and determining a time in which the specific type of user performs the computing activities. The computer program product may further include program instructions to use the machine-learning algorithm to detect a user experience with the cloud-based solution on one or more datacenters from the corpus of datacenters for each type of user based on the machine-learned user experience data, wherein detecting the user experience based on the machine-learned user experience data further comprises detecting user actions performed on the cloud-based solution by the specific type of user and the performance of the one or more datacenters during performance of the user actions. The computer program product may also include program instructions to use the machine-learning algorithm to correlate, for the specific type of user, the machine-learned user profile data with the machine-learned user experience data and the current and previous computing capabilities and performance of each datacenter in the corpus. The computer program product may further include program instructions to automatically migrate the cloud-based solution onto the datacenter from the corpus of datacenters for the specific type of user based on the correlation between the machine-learned user profile data, the machine-learned user experience data, and the current and previous computing capabilities and performance of the datacenter.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 4 is an exemplary chart including examples of user profile data which may be identified and captured by a program for automatically migrating a cloud-based solution onto a datacenter based on machine-learned user profile data and user experience data according to one embodiment;

FIG. 5 is an exemplary scoring chart for scoring and weighing different types of data received from a corpus of datacenters, user profile data, and user experience data according to one embodiment;

DETAILED DESCRIPTION

Figure 1:
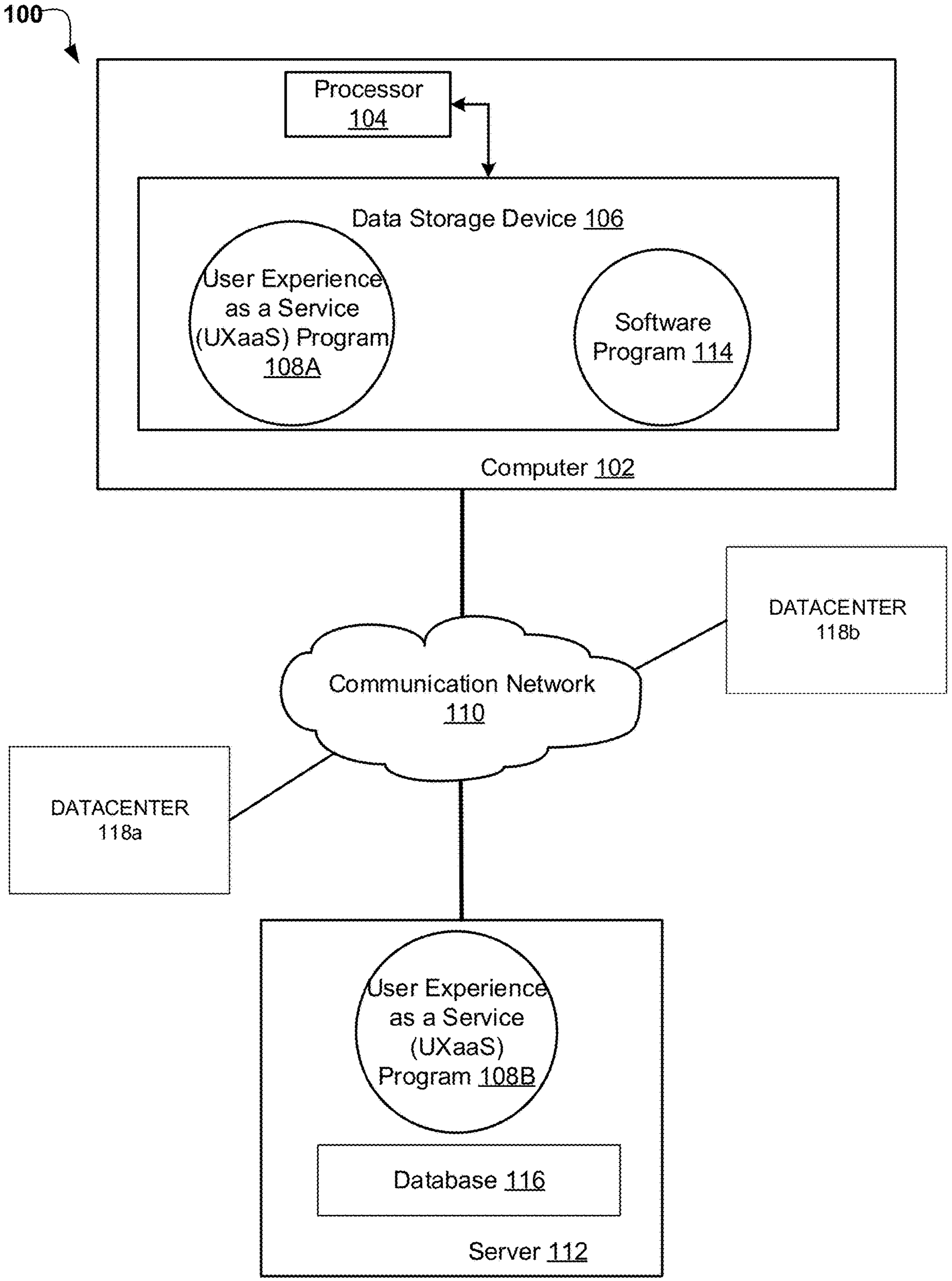
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to automatically migrating a cloud-based solution on datacenters based on machine-learned user profile data and user experience data. Specifically, according to one embodiment, the UXaaS program 108A, 108B may. More specifically, the following described exemplary embodiments provide a system, method and program product for automatically migrate the cloud-based solution by: 1) automatically and preemptively selecting a datacenter and migrating the cloud-based solution onto the datacenter for a specific type of user, and/or 2) automatically migrating the cloud-based solution onto a datacenter during real-time use of the cloud-based solution to provide an optimal (or improved) user experience for a specific type of user. Therefore, the present embodiment has the capacity to improve the technical field associated with migrating data not based on the traditional load balancing that may be already in place at the datacenters, but rather based on a machine learning and/or deep neural network model/algorithm (i.e. UXaaS) that takes into account and correlates the computing capabilities of the datacenters with different types of users and user experiences. More specifically, the present embodiments may automatically and cognitively generate and train a user experience as a service (UXaaS) model to learn and determine user profile data and user experience data for identifying user roles and user experiences in conjunction with a cloud-based solution and the different datacenters. Next, the present embodiment may apply the UXaaS model by using the user profile data and user experience data to, preemptively and/or in real-time, migrate the cloud-based solution to a datacenter to improve a user's experience with the cloud-based solution.

As previously described with respect to datacenters, computer resources may be hosted on datacenters which may be located in different geographical regions worldwide. For cloud computing, different types of users may have different computing experiences based in part information associated with the datacenter as well as based on the computing requirements that are specific to users and/or certain computing tasks. For example, a developer may be located in northern Canada where the developer may compile code to implement and ensure that a cloud-based solution works at a functional level, while a tester may be located in Brazil and run different types of testing software on the cloud-based solution including performance testing and end user simulations that may use additional computing resources and loads pertinent to testing the cloud-based solution. For each of these different types of users (i.e. the developer and tester), a datacenter may be used to run or perform the different types of computing tasks/activities associated with each user. However, depending on the geographical region of a respective datacenter, different datacenters may have different limitations and/or computing capabilities while certain computing requirements may be necessary depending on the type of user and the type of computing tasks being performed.

While traditional load balancing approaches may distribute a set of computing tasks over datacenters to avoid unevenly overloading computer nodes, the traditional load balancing approaches fail to distribute and/or migrate computing tasks by further taking into account machine-learned user profile data and user experience data. For example, when developing and deploying a cloud-based solution, a developer may experience the cloud-based solution on a robust datacenter with little to no network lag that includes computer resources that provide quick response times when performing certain tasks on the cloud-based solution. As such, developers may establish a baseline for how the cloud-based solution should perform based on the developer's experience and the computing resources and requirements associated with the datacenter used by the developer when using the cloud-based solution. However, an end-user or even a tester may have different user experiences based in part, for example, on the limitations of the geographical region associated with a given datacenter used by the user, the type of user or user's role, the types of computing tasks typically associated with and performed by the different types of users, and the times in which the computing tasks/activities are performed. For example, a developer sitting in the United States (US) and using a US-based datacenter may be developing a cloud-based solution that includes a search query feature in the cloud-based solution such that over a million database records associated with the cloud-based solution may be searched in response to receiving a query. However, while executing a search using the search query feature may be relatively fast for the developer, i.e. taking only a few seconds, an end-user sitting in a certain region in New Zealand may experience lag due to certain computing issues. Specifically, the computing issues may be attributed to a combination of the geographical location of the user, the location of the datacenter on which the cloud-based solution may be deployed, the type of user, the computing tasks being performed, the timing of when the computing tasks are being performed, and/or other events specific to the datacenter, the user, and the location of each. Again, while traditional load balancing approaches may distribute a set of computing tasks over datacenters to simply avoid unevenly overloading computer nodes, the traditional load balancing approaches fail to distribute and/or migrate computing tasks (or a cloud-based solution in general) by further taking into account machine-learned user profile data and user experience data that may, among other things, be specific to a certain type of user and relevant to the migration process for improving the user's experience.

As such, it may be advantageous, among other things, to provide a system, method, and program product that provides the ability to preemptively select a datacenter and/or switch between datacenters in real-time for deploying/hosting a cloud-based solution, not based on the traditional load balancing that may be already in place at the datacenters, but rather based on a machine learning and/or deep neural network model that takes into account and correlates the profile and experiences of a specific user, such as the user's role, the computer tasks being performed, and the contextual computing requirements and system expectations pertaining to the datacenters and the user.

Specifically, the present embodiment may provide a method, computer system, and computer program product for automatically migrating a cloud-based solution. Specifically, the method, computer system, and computer program product may generate, populate, and maintain a corpus of datacenters that includes the location and computing capabilities of each datacenter, whereby the datacenters may be located across and limited by different geographical regions. Furthermore, the method, computer system, and computer program product may automatically, cognitively, and continuously develop and train a user experience as a service (UXaaS) model (including algorithms) to identify different types of users as well as different user experiences based on learned user profile and user experience data. Next, the method, computer system, and computer program product may use the UXaaS model to automatically migrate the cloud-based solution by: 1) automatically and preemptively selecting a datacenter and migrating the cloud-based solution onto the datacenter for a specific type of user, and/or 2) automatically migrating the cloud-based solution between different datacenters during real-time use of the cloud-based solution to provide an optimal (or improved) user experience for a specific type of user.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run a user experience as a service (UXaaS) program 108A and a software program 114, and may also include a microphone (not shown). The software program 114 may be an application program such as a cloud-based solution, internet browser, and/or one or more mobile apps running on a client computer 102, such as a desktop or laptop. For example, the cloud-based solution may include applications, storage, on-demand services, computer networks, or other resources that are accessed with a network connection through a service provider's shared cloud computing framework. The UXaaS program 108A may communicate with the software program 114. The networked computer environment 100 may also include a server 112 that is enabled to run a UXaaS program 108B and the communication network 110. The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users. The network computer environment 100 may also be part of a cloud computing environment.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. Furthermore, the networked computer environment 100 may also include datacenters 118*a*, 118*b*, 118*c*. The datacenters 118*a*, 118*b*, 118*c* may be located in different geographical regions, for example, in different countries, cities, buildings, etc. The datacenters 118*a*, 118*b*, 118*c* may be part of an interconnected network of datacenters that communicate through the communication network 110. The datacenters 118*a*, 118*b*, 118*c* may also run and/or communicate with the software program 114 and the UXaaS program 108A, 108B via the communication network 110. The datacenters 118*a*, 118*b*, 118*c* may include a combination of routers, switches, firewalls, storage systems, servers, application-delivery controllers, and other computing devices.

The client computer 102 may communicate with the server computer 112 and the datacenters 118*a*, 118*b*, 118*c* via the communications network 110. The communications network 110 may include connections, such as wire, wireless communication links, or fiber optic cables. As will be discussed with reference to FIG. 7, client computer 102 and server computer 112 may include internal components 710 and external components 750. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the UXaaS program 108A, 108B may interact with a database 116 that may be embedded in various storage devices, such as, but not limited to, a mobile device 102, a networked server 112, or a cloud storage service.

According to the present embodiment, a program, such as a UXaaS program 108A and 108B may run on the client computer 102 and/or on the server computer 112 via a communications network 110. The UXaaS program 108A, 108B may automatically migrate a cloud-based solution. Specifically, a client computer 102, such as a desktop computer, laptop computer, tablet, and/or mobile device, may run a UXaaS program 108A, 108B, that may interact with a database 116 and a software program 114, to automatically select a datacenter and/or migrate data between different datacenters for a cloud-based solution based on learned user profile data and user experience data. More specifically, the UXaaS program 108A, 108B may generate, populate, and maintain a corpus of datacenters that includes the location and computing capabilities of each datacenter, whereby the datacenters may be located across different geographical regions. The UXaaS program 108A, 108B may maintain the corpus of datacenters by continuously detecting and monitoring the computing capabilities and performance of each datacenter such as by detecting and monitoring the computing resources located on each datacenter, current and previous performance each datacenter (such as response times, latency issues, lagging, etc.) network connections associated with each datacenter, and any computing limitations associated each datacenter based on the geographical region of a given datacenter. Furthermore, the UXaaS program 108A, 108B may automatically, cognitively, and continuously develop and train a user experience as a service (UXaaS) model (including algorithms) to identify different types of users as well as different user experiences based on learned user profile and user experience data. Next, the UXaaS program 108A, 108B may use the UXaaS model to automatically migrate the cloud-based solution by: 1) automatically and preemptively selecting a datacenter and migrating the cloud-based solution onto the datacenter for a specific type of user, and/or 2) automatically migrating the cloud-based solution between different datacenters during real-time use of the cloud-based solution to provide an optimal (or improved) user experience for a specific type of user. As such, the UXaaS program 108A, 108B may provide the ability to select and switch datacenters, not based on the traditional load balancing that may or may not be present at the datacenters, but rather based on a machine-learning and/or deep neural network model (i.e. a UXaaS model) that takes into account the expectations of the users when using a cloud-based solution using learned user profile data and user experience data.

Figure 2:
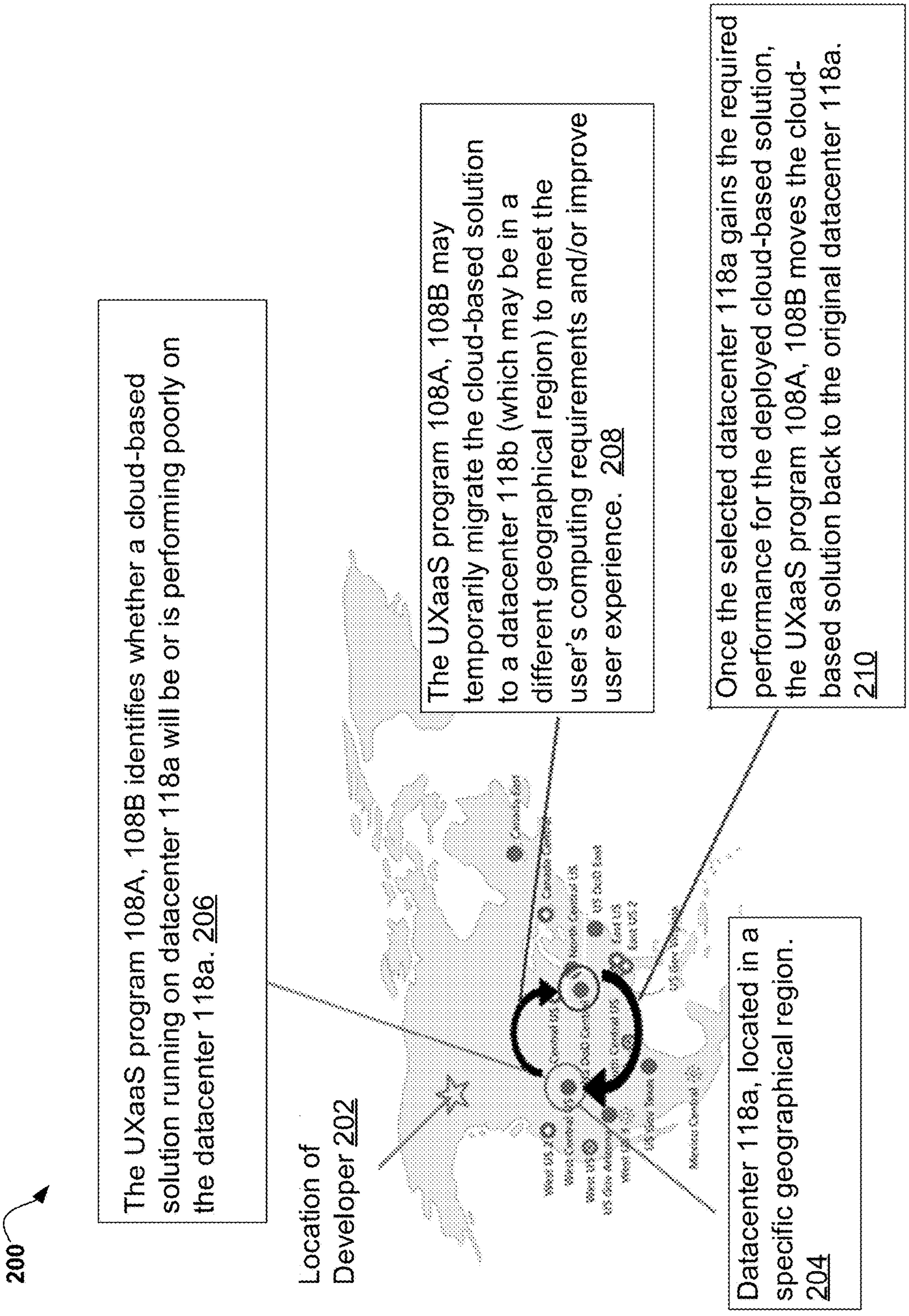
FIG. 2 is an example diagram illustrating a real-world application of a program for automatically migrating a cloud-based solution onto a datacenter based on machine-learned user profile data and user experience data according to one embodiment.

Referring now to FIG. 2, a diagram 200 illustrating an example application of the UXaaS program 108A, 108B in an exemplary scenario according to one embodiment is depicted. Specifically, the UXaaS program 108A, 108B may identify, for example, that a developer 202 (who may be located in northern Canada) may or may not select a datacenter 118*a* for deployment of a cloud-based solution for use by different types of users who may or may not be located within a vicinity of the geographical region of as depicted in at 204. However, according to one embodiment, based on continuous assessment of the computing capabilities of a corpus of datacenters (and the geographical regions associated with the datacenters), and based on machine-learned user profile data and user experience data detected and analyzed by a UXaasS model, the UXaaS program 108A, 108B may at 206: 1) predict that the cloud-based solution will perform slowly or poorly (i.e. perform at a less than threshold level) for certain types of users that may run the cloud-based solution on the datacenter 118*a*, and/or 2) in the case that a specific type of user is already running the cloud-based solution on the datacenter 118*a*, may identify in real-time whether the cloud-based solution is running poorly or at a less than threshold level on the datacenter 118*a*. More specifically, and according to one embodiment, the UXaaS program 108A, 108B may use the UXaaS model to: 1) perform simulations of potential user experiences with the cloud-based solution on the datacenter 118*a* to predict a user's experience based on the user profile data and user experience data (including, but not limited to, the type of user and the computing tasks that may be performed), and/or 2) perform real-time assessments of the performance of the datacenter 118*a* and the cloud-based solution during use of the cloud-based solution on the datacenter 118*a* to identify whether a user is receiving an optimal experience with the cloud-based solution.

In turn, based on the simulation and/or real-time assessment of the performance of the datacenter 118*a* and the cloud-based solution, the UXaaS program 108A, 108B may determine that the cloud-based solution may perform or is performing at a less than intended threshold level. Therefore, the UXaaS program 108A, 108B may preemptively or in real-time identify a different datacenter 118*b*, which may be located in a different geographical region than datacenter 118*a*, to migrate the cloud-based solution (or according to one embodiment, migrate specific computing tasks to be performed by the cloud-based solution) to provide optimal performance of the cloud-based solution for the intended user. According to one embodiment, and as will be explained, the datacenter 118*b* may fully satisfy or not fully satisfy the necessary computing performance as intended for executing the computing tasks and/or satisfy the computing preferences of the user. However, the datacenter 118*b* may be an optimal choice for improving a user's experience out of a list of datacenters based on a score. Thus, in the case of not fully meeting the computing performance and/or satisfying user preferences, the UXaaS program 108A, 108B may still select the datacenter 118*b* for migrating the cloud-based solution for being deemed the optimal choice among a list of datacenters to choose from in the corpus of datacenters. Furthermore, according to one embodiment, the UXaaS program 108A, 108B at 208 may temporarily migrate the data associated with the cloud-based solution from the datacenter 118*a* to the datacenter 118*b*. For example, datacenter 118*a* may be a specific type of user's preferred datacenter. As such, the UXaaS program 108A, 108B may temporarily migrate the cloud-based solution to the datacenter 118*b* for the time it takes for the datacenter 118*a* to meet the intended computing performance for the computing tasks being performed and/or the computing preferences of the user. Accordingly, and as depicted at 210, the UXaaS program 108A, 108B may continuously monitor the computing performance of the datacenters 118*a*, 118*b* as well as specifically determine a user's potential or current experience with the cloud-based solution on the datacenter 118*a*, and once the datacenter 118*a* gains the required computing performance for the user and/or computing tasks, the UXaaS program 108A, 108B may migrate the cloud-based solution back to the datacenter 118*a*. It may be appreciated that FIG. 2 provides an illustration of only one implementation and does not imply any limitations with regard to how different embodiments may be implemented which will be described later.

Figure 3:
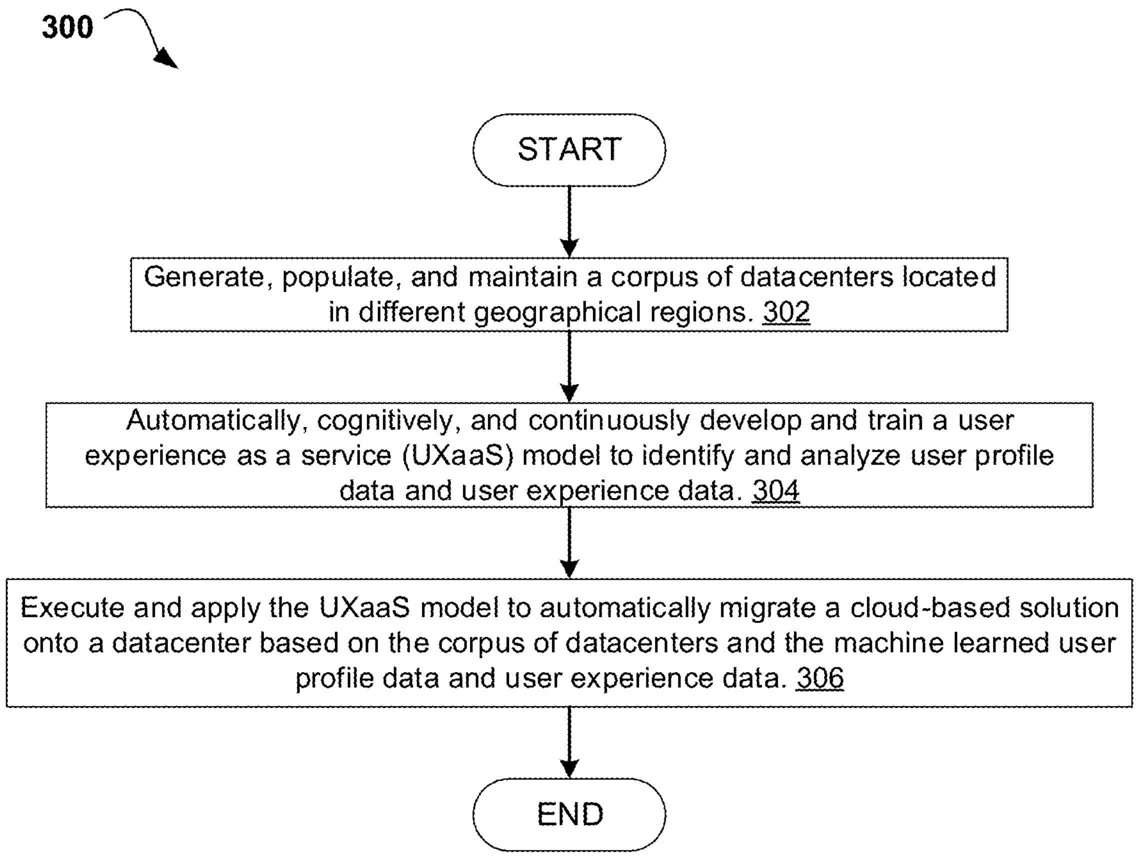
FIG. 3 is an operational flowchart illustrating the steps carried out by a program for automatically migrating a cloud-based solution onto a datacenter based on machine-learned user profile data and user experience data according to one embodiment.

Referring now to FIG. 3, an operational flowchart illustrating the steps carried by a program for automatically migrating a cloud-based solution onto a datacenter based on machine-learned user profile data and user experience data according to one embodiment is depicted. Specifically, at 302, the UXaaS program 108A, 108B may populate and maintain a corpus of datacenters. As previously described with respect to FIG. 1, the networked computer environment 100 may include datacenters 118*a*, 118*b*. The networked computer environment 100 may include a plurality of datacenters only two of which are shown for illustrative brevity The datacenters 118*a*, 118*b* may be located in different geographical regions, for example, in different countries, cities, buildings, etc. The datacenters 118*a*, 118*b* may be part of an interconnected network of datacenters that communicate through the communication network 110. The datacenters 118*a*, 118*b* may also be capable of running a software program 114 as well as the UXaaS program 108A, 108B and/or may communicate with the software program 114 and the UXaaS program 108A, 108B via the communication network 110. The datacenters 118*a*, 118*b* may include a combination of routers, switches, firewalls, storage systems, servers, application-delivery controllers, and other computing devices.

According to one embodiment, the corpus of datacenters may be stored on a database associated with the UXaaS program 108A, 108B, such as database 116 shown in FIG. 1.

Furthermore, and as previously described, the corpus may include a list of datacenters which may be received by the UXaaS program 108A, 108B and/or generated by the UXaaS program 108A, 108B by detecting each datacenter. The UXaaS program 108A, 108B may continuously monitor and maintain the corpus of datacenters. For example, the UXaaS program 108A, 108B may include datacenter monitoring software and/or may leverage datacenter monitoring software to monitor the different datacenters 118*a*, 118*b* and continuously track the computing capabilities of each datacenter. As such, the UXaaS program 108A, 108B may be capable of automatically providing real-time insights and visibility into the health and status of the datacenters 118*a*, 118*b* by tracking specific metrics in real-time and sending alerts or notifications when readings exceed or fall below set thresholds. According to one embodiment, datacenters may be also added or removed from the corpus.

Next, at 304, the UXaaS program 108A, 108B may automatically, cognitively, and continuously develop and train a user experience as a service (UXaaS) model. Specifically, the UXaaS model may include one or more combinations of machine learning algorithms for identifying user profile data and user experience data. For example, the UXaaS model may include one more combinations of machine-learning algorithms such as linear regression, logistic regression, decision tree, support vector machine (SVM) algorithm, Naive Bayes algorithm, k-nearest neighbors (KNN) algorithm, k-means clustering algorithm, random forest algorithm, dimensionality reduction algorithms, gradient boosting algorithm, and adaptive boosting (AdaBoost) algorithm. The UxaaS model may use the different machine-learning algorithms to detect and analyze user profile data associated with different users, whereby detecting the user profile data may include identifying a type of user that may be using or may potentially use a cloud-based solution on a certain datacenter as well as detecting a user's behavioral patterns with respect the cloud-based solution on the datacenter. For example, during development and deployment stages of a cloud-based solution, different users, such as a developer, tester, database admins, power users, and end-users may interact with the cloud-based solution. Therefore, according to one embodiment, the UXaaS program 108A, 108B may use the UXaaS model to identify a type of user or a user's role by, for example, detecting and classifying the computing activities performed by a respective user. More specifically, for example, the UXaaS program 108A, 108B may use the UXaaS model to identify that a user commonly performs the computing activities of developing and implementing code, and thus, may categorize the type of user as a developer. The UXaaS model may also use other available information such as an employee/user directory and/or IP address to further identify and/or confirm the type of user or the user's role.

FIG. 4 provides an exemplary table 400 that includes additional examples of user profile data which may be identified and captured by the UXaaS program 108A, 108B, and more specifically, by the UXaaS model. According to one embodiment, the UXaaS model may be trained to automatically detect the various examples of user profile data provided in exemplary table 400 by for example, receiving different samples of user profile data as training data which may be associated with a knowledge corpus. Also, according one embodiment, the UXaaS program 108A, 108B may include a user interface with fields that enables a user to manually enter the different types of user profile data as described in the exemplary table 400. In either scenario, the UXaaS model may use the machine-learning algorithms to identify user profile data such as a user's name 402, the type of user or user role 404, user location data 406, preferred datacenter 408 (further including a user's preferred datacenter for performing specific computer tasks/activities), typical computer activities performed 410, language preferences 412, typical time of peak computing activity 414, minimum computing requirements per computing activity based on a service level agreement (SLA) 416 latency requirements for certain computing tasks 418, response percentage required for computing tasks/activities 420, and scheduled computing tasks/activities 422. For example, the UXaaS program 108A, 108B may use the UXaaS model to determine when the user performs specific computing tasks/activities such as identifying whether a specific type of user typically performs certain computing tasks/activities, and/or load-intensive activities, during the daytime or a at night as well as may determine the specific time the specific type of user performs such activities (such as 3:00 pm). The UXaaS program 108A, 108B may also determine a user's typical location when performing specific computing tasks/activities and the datacenters that a user may typically use or prefer for such computing tasks. For example, the UXaaS model may use the machine-learning algorithms as well as GPS tracking or an IP address to determine that a user, such as a tester, may be located in a certain city or country 90% of the time when performing certain testing tasks/activities on a cloud-based solution.

In turn, the UXaaS program 108A, 108B may correlate/associate the different types of machine-learned user profile data by, for instance, correlating/associating a type of user with the computing tasks/activities typically performed by that type of user, the timing of when those computing tasks/activities are typically performed, the location of that type of user when performing those computing tasks/activities, and the datacenters that type of user uses and/or prefers. For example, the UXaaS program 108A, 108B may determine a specific type of user as a tester and that the tester typically performs computing tasks/activities that ensures a cloud-based solution created by a developer is fit for its purpose and may, therefore, perform computing activities such as searching for and removing any bugs or issues. The UXaaS program 108A, 108B may further determine that the computing activities performed by the tester are typically performed on the datacenter 118*a* (FIG. 1) and during a peak time of 2:00 p. m. eastern standard time each day. In turn, the UXaaS program 108A, 108B may use the identified and correlated user profile data to establish user profiles for each of the different types of users and may further correlate the user profile data with the datacenters and/or geographical regions that are used or may be used by the user. For example, the UXaaS program 108A, 108B may use the UXaaS model to further correlate certain types of users or user roles with certain regions or datacenters.

In addition to the learned user profile data, the UXaaS program 108A, 108B may use the UXaaS model/algorithms to also identify user experience data. Specifically, according to one embodiment, the UXaaS program 108A, 108B may identify user experience data by tracking and detecting a user's real-time use of a cloud-based solution to determine the user's experience with the cloud-based solution. More specifically, the UXaaS program 108A, 108B may automatically track and detect user experience data such as by detecting specific user actions. For example, the UXaaS program 108A, 108B may track and detect user actions that may indicate an issue with the cloud-based solution, such as (but not limited to) repeated clicks by the user on a keyboard and/or clicks on a specific feature that may not be responding on the cloud-based solution. Also, for example, the UXaaS program 108A, 108B may track user experience data by tracking the performance of the cloud-based solution as well as the performance of the datacenter during a user's computer session. For example, the UXaaS program 108A, 108B may use the UXaaS model to track and detect response times and/or an elapsed time for performing specific computing tasks, buffering and/or lagging issues, and response percentages. According to one embodiment, the UXaaS program 108A, 108B may also include a user interface to further receive user feedback on the performance of the cloud-based solution performance. For example, the UXaaS program 108A, 108B may present a pop-up window to a user that says "we have identified slow system performance which might be impacting user experience. Please rate impact of experience 1-5." Then, the the UXaaS program 108A, 108B may incorporate the received user feedback into the UXaaS model to further adjust and/or reinforce the UXaaS model.

The UXaaS program 108A, 108B may also use the UXaaS model to correlate the user profile data with the user experience data by, for example, correlating a specific type of user with certain user actions and the computing performance of the cloud-based solution on certain datacenters. The UXaaS program 108A, 108B may also use the correlation as trending feedback to further identify patterns and determine whether certain datacenters deliver positive results or negative results for certain types of users. More specifically, the UXaaS model may use the correlated user profile data and user experience data to identify patterns and rank different datacenters according to user roles such that some datacenters may be better suited for processing certain role-based computing activities based on (but not limited to) the processing capabilities and/or networking connection associated with the datacenters. For example, the UXaaS program 108A, 108B may use the UXaaS model to recognize that datacenter 118*a* (or a datacenter located in a certain geographical region) may be more suitable or equipped with performing the computing tasks/activities of a tester than those of an end-user based on tracked computing performance data that is correlated with the user profile and user experience data. Therefore, the computing capabilities of the datacenters (and specific geographical regions) may be correlated with the computing requirements of a specific type of user. According to one embodiment, the UXaaS program 108A, 108B, may also use the UXaaS model to identify other types of feedback including temporal feedback, which may include detecting anomalies in the computer capabilities of certain datacenters due to certain temporal situations or constraints. In such a situation, the detected temporal feedback may be disregarded if detected to be an inaccurate measure of the typical computer processing capabilities of a datacenter and/or geographical region during certain times.

Next, at 306, the UXaaS program 108A, 108B may use/apply the UXaaS model to automatically migrate a cloud-based solution onto a datacenter based on the corpus of datacenters and the machine-learned user profile data and user experience data. Specifically, according to one embodiment, the UXaaS program 108A, 108B may automatically migrate the cloud-based solution by: 1) automatically and preemptively selecting a datacenter for deploying the cloud-based solution for a specific type of user, and/or 2) automatically migrating the cloud-based solution between different datacenters during real-time use of the cloud-based solution to provide an optimal (or improved) user experience for a specific type of user.

Specifically, in a process for automatically migrating the cloud-based solution by preemptively selecting a datacenter for deployment of the cloud-based solution, the UXaaS program 108A, 108B may use the correlated data associated with the corpus of datacenters as well as the machine-learned user profile data and user experience data to identify a datacenter to deploy the cloud-based solution and then may automatically migrate the cloud-based solution onto the identified datacenter. Therefore, the UXaaS program 108A, 108B may preemptively select a suitable datacenter for a specific user before deploying the cloud-based solution, and/or before the specific user begins using/accessing the cloud-based solution, and migrate the cloud-based solution onto the datacenter based on the selection. More specifically, to preemptively select a datacenter, the UXaaS model may use the location of each datacenter (which may be based on geographical distance from the user) as well as the computing performance and capabilities of the datacenters, which may include identifying and analyzing the current computing capabilities and network connections associated with the different datacenters as well as historical performance of the different datacenters. For example, the historical performance data may include previous performances of a given datacenter (such as detecting typical performance, computing capabilities, and network connections associated with a given datacenter), as well as any previous performance of the cloud-based solution on the given datacenter (which may be further based on the type of user and/or type of computing tasks performed on the datacenter), and the times when load-intensive computing activities may be performed on the datacenter (such as determining what days and/or specific times a given datacenter may typically experience a threshold level of load-intensive activities).

In addition to using the performance data and computing capabilities of the datacenters in the process for preemptively selecting a datacenter, the UXaaS model may use and correlate such data with the machine-learned user profile data and user experience data as previously described. For example, the UXaaS model may use and correlate the performance data and computing capabilities of the datacenters with the machine-learned user profile data and user experience data by identifying a user's role or the type of user that will use a datacenter, identifying times when the specific type of user may access a datacenter, identify user preferences such as a user's preferred datacenter and/or computing requirements, determine the computing tasks/activity typically performed by that type user (whereby certain tasks may perform better on certain datacenters over other datacenters), identify any scheduled performance of certain computing tasks, and identify the machine-learned computing requirements or user-defined computing requirements for the type of user or the type of computing tasks/activities (such as required response times, latency requirements, etc.).

In turn, when preemptively selecting a datacenter to deploy a cloud-based solution, the UXaaS program 108A, 108B may use the above-described data associated with the corpus of datacenters as well as use the machine-learned user profile data and user experience data to simulate user experiences on the different datacenters. For example, and as previously described with respect to FIG. 2, a developer 202 (who may be located in northern Canada) may be developing a cloud-based solution. Specifically, the developer 202 may be developing the cloud-based solution on a datacenter with specific computing capabilities such as a threshold amount of RAM, a threshold amount of storage, and/or a threshold amount of servers and other computing resources that may generate a specific amount of computer processing power. As such, the developer 202 may intend for the cloud-based solution to run on a datacenter with similar computing capabilities for different types of users to provide an optimal user experience. According to one embodiment, the developer 202 may or may not select a datacenter for initial deployment of the cloud-based solution based on the specific types of users. However, in the case of the developer 202 selecting a datacenter, the UXaaS program 108A, 108B may still automatically and preemptively select (and/or suggest/predict), an alternative datacenter that may improve a user's experience for that specific type of user based on data associated with the datacenters and the machine-learned user profile data and user experience data. Therefore, in either scenario (i.e. the developer selecting or not selecting a datacenter), the UXaaS program 108A, 108B may automatically and preemptively select, and/or predict/suggest, a datacenter to deploy the cloud-based solution by simulating a user's experience on a given datacenter using the data associated with the datacenters and the machine-learned user profile data and user experience data.

For example, based on the machine-learned user profile data and user experience data, the UXaaS program 108A, 108B may identify that the type of user is a tester of the cloud-based solution. As such, the UXaaS program 108A, 108B may simulate the tester's experience with the cloud-based solution on a given datacenter from the corpus of datacenters by correlating and incorporating the data specifically learned from the given datacenter and the user profile data and user experience specifically associated with that tester (or with testers in general if no specific data on the specific user is found). More specifically, for example, the UXaaS program 108A, 108B may identify and simulate the typical computing tasks/activities associated with the tester, the times the tester may perform such computing tasks/activities, the computing capabilities of a given datacenter for the times the tester may perform such computing tasks/activities, and user preferences (such as preferred datacenters and computing requirements). According to one embodiment, the UXaaS program 108A, 108B may simulate the tester's experience with the cloud-based solution on one or more datacenters from the corpus of datacenters. Thus, the UXaaS model may predict which datacenter may provide an optimal experience for the user based in part on one or more combinations of the type of user, the computing tasks being performed, the times the computing tasks are performed, the statuses of the datacenters during possible execution of the computing tasks, and user preferences/requirements. For example, based on a simulation, the UXaaS model may predict that the cloud-based solution will perform slowly or poorly (i.e. perform at a less than threshold level) for a certain type of user that may run the cloud-based solution on the datacenter 118*a*, while the cloud-based solution may perform at an optimal level for a different type of user using the same datacenter at the same time. In turn, the UXaaS program 108A, 108B may use the simulations in a process to automatically and preemptively select a datacenter for deploying the cloud-based solution to provide the specific type of user with an optimal user experience. .

Similarly, the UXaaS program 108A, 108B may automatically migrate the cloud-based solution between datacenters during real-time use of the cloud-based solution to provide an optimal user experience for specific type of users. Specifically, and as previously described at 306, the UXaaS program 108A, 108B may automatically migrate the cloud-based solution by: 1) automatically and preemptively selecting a datacenter and migrating the cloud-based solution onto the datacenter for a specific type of user as described above, and/or 2) automatically migrating the cloud-based solution between different datacenters during real-time use of the cloud-based solution to provide an optimal (or improved) user experience for a specific type of user. Accordingly, the UXaaS model may use a similar process for automatically migrating the cloud-based solution between different datacenters during real-time use of the cloud-based solution that is used in the process of automatically and preemptively selecting a datacenter for deploying the cloud-based solution.

Specifically, and as previously described with respect to FIG. 1, the UXaaS program 108A, 108B may continuously monitor and maintain the corpus of datacenter as well as track the computing capabilities of each datacenter. Furthermore, the UXaaS model may identify and track user profile data and user experience data by tracking and detecting a user's real-time use of a cloud-based solution to determine the user's experience with the cloud-based solution. More specifically, the UXaaS program 108A, 108B may automatically track and detect user experience data such as by detecting specific user actions. For example, the UXaaS program 108A, 108B may track and detect user actions that may indicate an issue with the cloud-based solution, such as repeated clicks by the user on a keyboard and/or clicks on a specific feature that may not be responding on the cloud-based solution. Also, for example, the UXaaS program 108A, 108B may track user experience data by tracking the performance of the cloud-based solution as well as the performance of the datacenter during a user's computer session. For example, the UXaaS program 108A, 108B may use the UXaaS model to track and detect response times and/or an elapsed time for performing specific computing tasks, buffering and/or lagging issues, and response percentages.

Therefore, the UXaaS program 108A, 108B may use the UXaaS model to provide real-time insights and visibility into the status and performance of the datacenters 118*a*, 118*b* as well as the performance of the cloud-based solution, and in turn, may automatically migrate the cloud-based solution in real-time from one datacenter 118*a* to another datacenter 118*b* in response to the datacenter 118*a* failing to provide an optimal experience to the user. Thus, for example, the UXaaS model may identify that the datacenter 118*b* may provide an optimal experience for the user based in part on one or more combinations of the type of user, the user's actions, the computing tasks being performed, the response times of the computing tasks that are being performed, the statuses of the datacenters during execution of the computing tasks, and user preferences/requirements.

Accordingly, based on either the simulation and/or real-time assessment of the performance of the datacenter 118*a* and the cloud-based solution (as well as based on the user profile data and user experience data), the UXaaS program 108A, 108B may determine that the cloud-based solution may perform or is performing at a less than intended level. Therefore, the UXaaS program 108A, 108B may preemptively or in real-time identify a different datacenter 118*b*, which may be located in a different geographical region than datacenter 118*a*, to migrate the cloud-based solution (or migrate specific computing tasks to be performed by the cloud-based solution) to provide optimal performance for the cloud-based solution.

Furthermore, in addition to the performance of the datacenters, the performance of the cloud-based solution, and the user profile data and user experience data, the UXaaS program 108A, 108B may also use determined and weighted scores to preemptively select a datacenter and/or migrate the cloud-based solution to a different datacenter in real-time. Accordingly, while the datacenter 118*b* may not fully provide the necessary computing performance as intended for executing the computing tasks and/or fully satisfy user preferences, the datacenter 118*b* may be an optimal choice for improving a user's experience of the cloud-based solution based on the determined and weighted scores for the different datacenters in the corpus. As such, the determined and weighted scores associated with the different datacenters may be used by the UXaaS program 108A, 108B to rank the datacenters for specific types of users.

Specifically, and as depicted in an exemplary scoring chart 500 in FIG. 5, the UXaaS program 108A, 108B may score and weigh the different types of data received from the corpus of datacenters, the user profile data, and the user experience data, and then use the determined and weighted scores to preemptively select a datacenter and/or migrate in real-time the cloud-based solution to a different datacenter. More specifically, and as previously described but now with reference to FIG. 5, the UXaaS program 108A, 108B may determine to select a datacenter and/or migrate a cloud-based solution to a different datacenter using factors such as the location of each datacenter 502 (which may be based on geographical distance from the user), the timing of the computing tasks/activity 504, the type of user (or user role) 506, the type of computing tasks/activities performed 508, the minimum computing requirements expected for performing the computing tasks/activities 510 (which may be further based on a service level agreement (SLA) and a comparison between the computing capabilities expected/achievable by the datacenter and the computing requirements expected by the user), and any user preferred datacenters 512. As depicted in FIG. 5, each of the different types of factors/data may be scored on a scale of 0-100 (worst to best). According to one embodiment, the determined scores may be based on different threshold levels associated with each of the different factors. For example, with regard to the location of a datacenter 502, the UXaaS program 108A, 108B may further use the UXaaS model (including the user profile data and user experience data) to determine that a threshold distance of 100 miles or less may be an optimal distance for a datacenter to provide an optimal experience for a user using the cloud-based solution. Accordingly, the UXaaS program 108A, 108B may give a high score such as a 90 (as depicted for datacenter 118*b* in FIG. 5) to a datacenter that falls within the range of 100 miles (or within a determined distance just outside of that range), while a datacenter having an even greater distance from the 100 miles may be given a lower score that corresponds to the distance such as a 55 (as depicted for datacenter 118*a* in FIG. 5). Similarly, based on the user profile data and user experience data, the UXaaS model may also determine that certain datacenters may be equipped with a threshold amount of computing resources/capabilities for certain types of user roles or certain computing tasks/activities, and the UXaaS model may determine a score corresponding to the roles and/or computing activities.

According to one embodiment, the UXaaS program 108A, 108B may weigh each of the determined factors and scores differently. Specifically, according to one embodiment, the UXaaS program 108A, 108B may include a default weight for each of the different factors that may also be determined by a user such as a developer. Furthermore, the UXaaS program 108A, 108B may adjust the weights based on user feedback. As previously described, the UXaaS program 108A, 108B may include a user interface to receive user feedback on the performance of the cloud-based solution performance. For example, the UXaaS program 108A, 108B may present a pop-up window to a user that says "we have identified slow system performance which might be impacting user experience. Please rate impact of experience 1-5." The UXaaS program 108A, 108B may also include question asking the user to "identify the issue which may have caused the poor performance," and may list options such as "a) the datacenters distance from user, b) computing capabilities for the task being performed, etc." In turn, UXaaS program 108A, 108B may use the user feedback to adjust the weights of a given factor. The UXaaS program 108A, 108B may also include a user interface to enable a user to directly adjust the weights. In any case, and as depicted in FIG. 5, the weights may be represented by a number (which, according to one embodiment, may further be based on a scale of 0 to 1.00, least favored to highest favored) and used to multiply a determined score for a certain factor to indicate that one factor should be favored over another factor when determining which datacenter to host the cloud-based solution. For example, while a datacenter's distance from a user 502, a user's role 506 and the type of computing activity performed 508 may be given a weight of 0.1 (as depicted in FIG. 5), the time that the computing activities are performed 504 (or will be performed) as well as the user's preferred datacenter 512 may be given a greater weight of 0.2 by the UXaaS program 108A, 108B. The UXaaS program 108A, 108B may, in turn, sum of the determined scores for each of the different factors to present an overall score for choosing an optimal datacenter for the user's experience.

Figure 6:
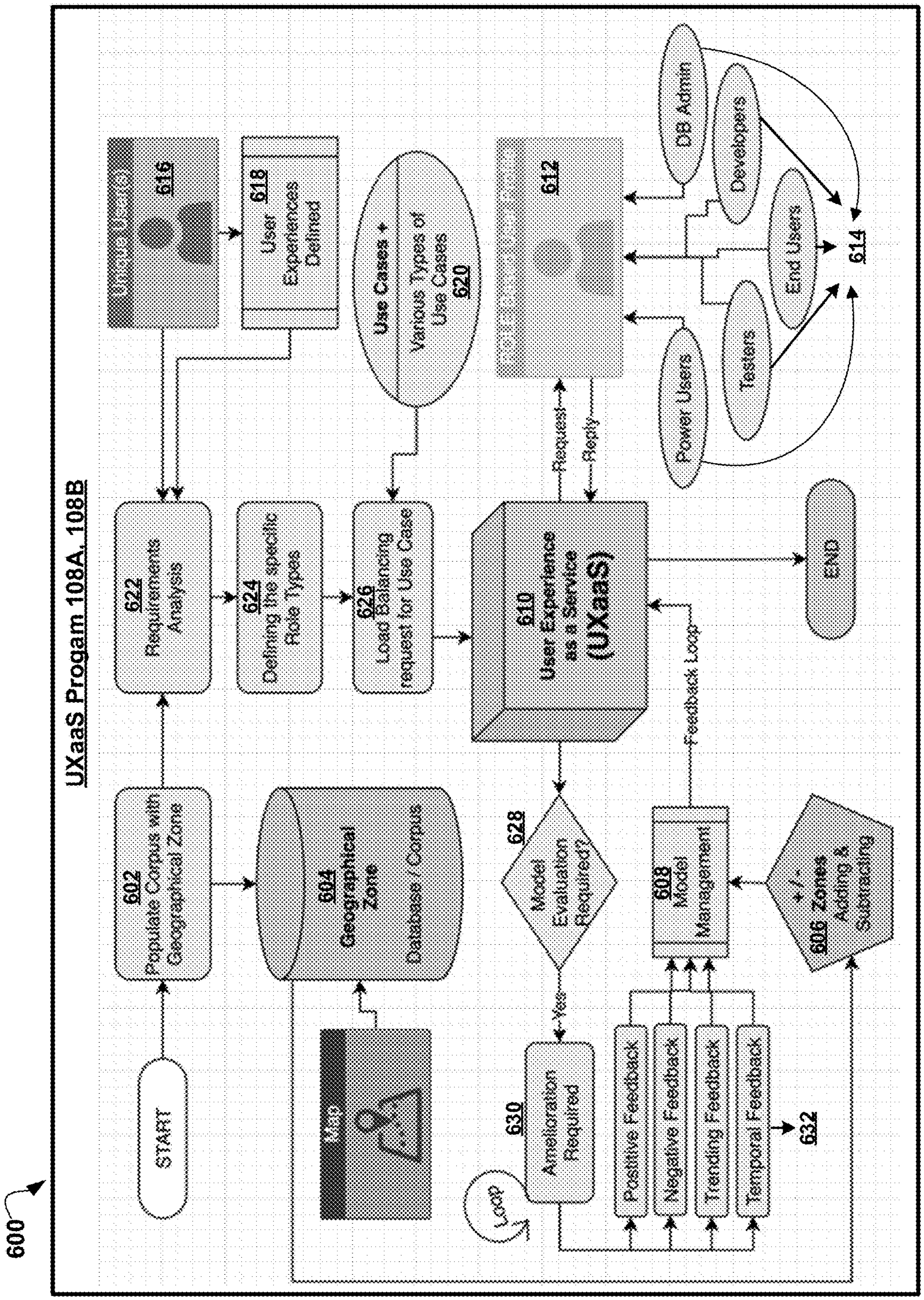
FIG. 6 is a more detailed operational flowchart illustrating the steps carried out by a program for automatically migrating a cloud-based solution onto a datacenter based on machine-learned user profile data and user experience data according to one embodiment

Referring now to FIG. 6, a more detailed operational flowchart 600 representing the steps carried out by the UXaaS program 108A, 108B for automatically migrating a cloud-based solution on datacenters based on the corpus of datacenters and the machine-learned user profile data and user experience data according to one embodiment is depicted. Specifically, and as depicted in FIG. 6, the UXaaS program 108A, 108B may start at 602 with populating a corpus of datacenters and include information on the geographical regions/zones where each datacenter may be located. Furthermore, at 604, the UXaaS program 108A, 108B may store the corpus of datacenters on a database, such as database 116 (as depicted in FIG. 1). The UXaaS program 108A, 108B may also continuously maintain the corpus and add or subtract datacenters from the corpus as depicted at 606. The UXaaS program 108A, 108B may also feed the data associated with the corpus of datacenters into the UXaaS model (depicted at 610) during operational management of the UXaaS model at 608. As previously described, the UXaaS program 108A, 108B may also use the UXaaS model (610) to gather user profile data 612 which may include detecting the type of user and/or a user's role. As previously described, the UXaaS program 108A, 108B may automatically detect the user's role based on detected user activity and/or by contacting a database that may include user information (such as an employee directory). The UXaaS program 108A, 108B may also request information from the user via a user interface. As depicted in FIG. 6, examples of a user role 614 may include power users, testers, end-users, developers and database (DB) administrators.

Furthermore, the UXaaS program 108A, 108B may use the UXaaS model (610) to detect user experience data. Specifically, for each type of user 616, the UXaaS program 108A, 108B may determine/define user experiences at 618 by detecting and tracking user actions and different use cases 620 of the cloud-based solution by the user. In turn, the UXaaS program 108A, 108B may correlate the analysis of the computing requirements 622 of the user with the type of user's role 624 and any load balancing actions 626 that may have been performed during certain use cases. As previously described, the UXaaS program 108A, 108B may use the UXaaS model (610) to receive the user profile data and user experience data for analysis in order to automatically migrate the cloud-based solution by: 1) automatically and preemptively selecting a datacenter and migrating the cloud-based solution onto the datacenter for a specific type of user, and/or 2) automatically migrating the cloud-based solution between different datacenters during real-time use of the cloud-based solution to provide an optimal (or improved) user experience for a specific type of user. At 628, the UXaaS program 108A, 108B may constantly evaluate the UXaaS model (610) in an effort to ameliorate 630 (or improve) the UXaaS model (610) by, for example, detecting and receiving different types of feedback 632 as previously described above with respect to 304 in FIG. 3. The UXaaS program 108A, 108B may, in turn, use the different types of feedback to improve the UXaaS model (610)

In turn, the UXaaS program 108A, 108B may use the UXaaS model (610) to: 1) predict whether a cloud-based solution will perform poorly (i.e. perform at a less than threshold level) for certain users that may run the cloud-based solution on a certain datacenter, and/or 2) identify in real-time whether the cloud-based solution is running slowly or at a less than threshold level. Accordingly, and respectively, the UXaaS program 108A, 108B may use the user profile data and user experience data to: 1) perform simulations of potential user experiences with the cloud-based solution on the datacenter to predict a user's experience based on, among other things, the type of user and the computing tasks that may be performed, and/or 2) perform real-time assessments of the performance of a datacenter and the cloud-based solution during deployment of the cloud-based solution on the datacenter to identify whether a user's experience may be improved by migrating to a different datacenter.

It may be appreciated that FIGS. 1-6 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
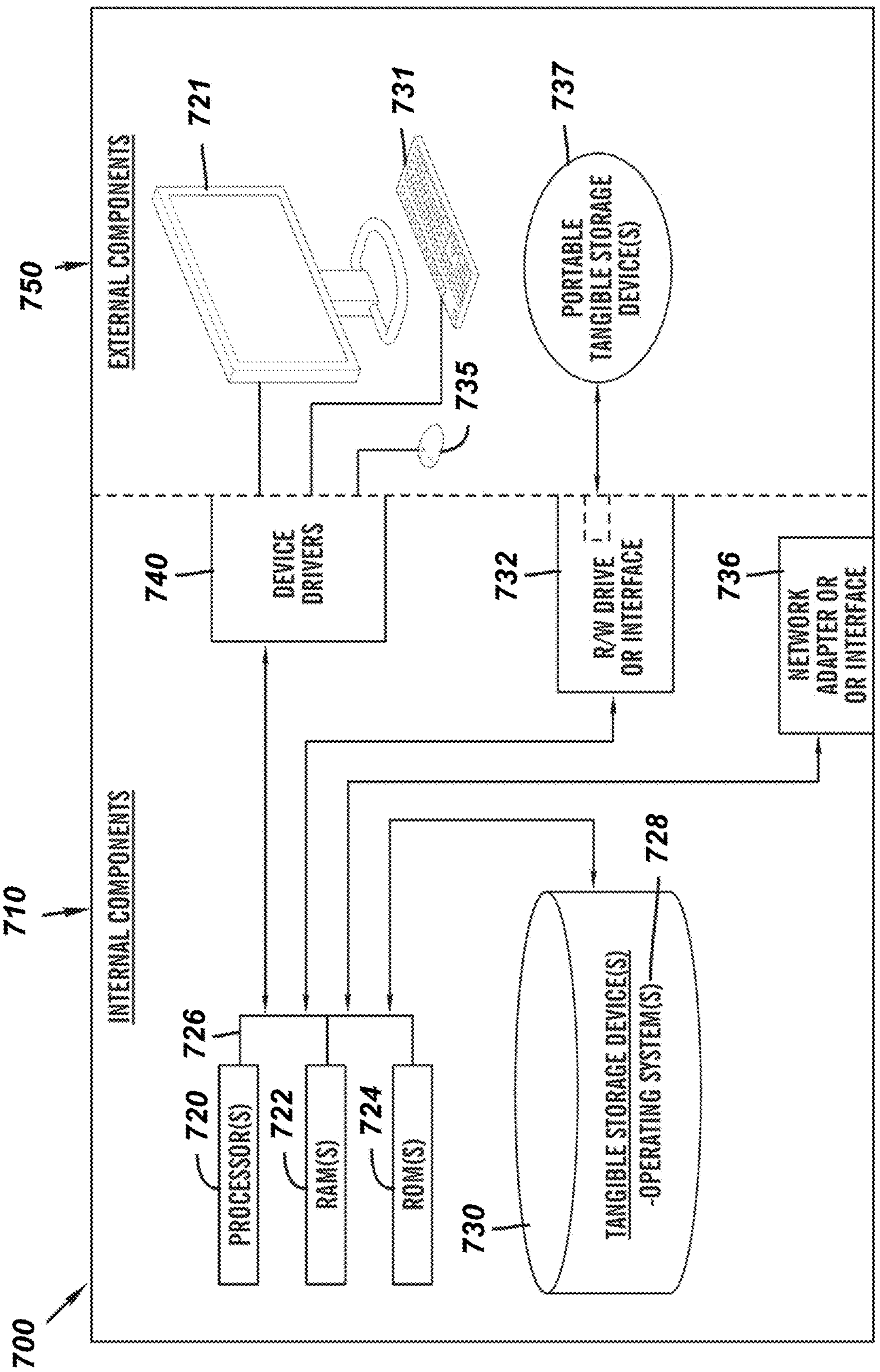
FIG. 7 is a block diagram of the system architecture of the program for automatically migrating a cloud-based solution onto a datacenter based on machine-learned user profile data and user experience data according to one embodiment.

FIG. 7 is a block diagram 700 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 710, 750 is representative of any electronic device capable of executing machine-readable program instructions. Data processing system 710, 750 may be representative of a smart phone, a computer system, PDA, or other electronic devices. Examples of computing systems, environments, and/or configurations that may represented by data processing system 710, 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710 and external components 750 illustrated in FIG. 7. Each of the sets of internal components 710 includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the UXaaS program 108A (FIG. 1) in client computer 102 (FIG. 1), and the UXaaS program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 6, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 also includes a RAY drive or interface 732 to read from and write to one or more portable computer-readable tangible storage devices 737 such as a CD-ROM, DVD, memory stick, magnetic tape, magnetic disk, optical disk or semiconductor storage device. A software program, such as an UXaaS program 108A and 108B (FIG. 1), can be stored on one or more of the respective portable computer-readable tangible storage devices 737, read via the respective R/W drive or interface 732, and loaded into the respective hard drive 730.

Each set of internal components 710 also includes network adapters or interfaces 736 such as a TCP/IP adapter cards, wireless Wi-Fi interface cards, or 3G or 4G wireless interface cards or other wired or wireless communication links. The UXaaS program 108A (FIG. 1) and software program 114 (FIG. 1) in client computer 102 (FIG. 1), and the UXaaS program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the UXaaS program 108A (FIG. 1) and software program 114 (FIG. 1) in client computer 102 (FIG. 1) and the UXaaS program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750 can include a computer display monitor 721, a keyboard 731, and a computer mouse 735. External components 750 can also include touch screens, virtual keyboards, touch pads, pointing devices, and other human interface devices. Each of the sets of internal components 710 also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
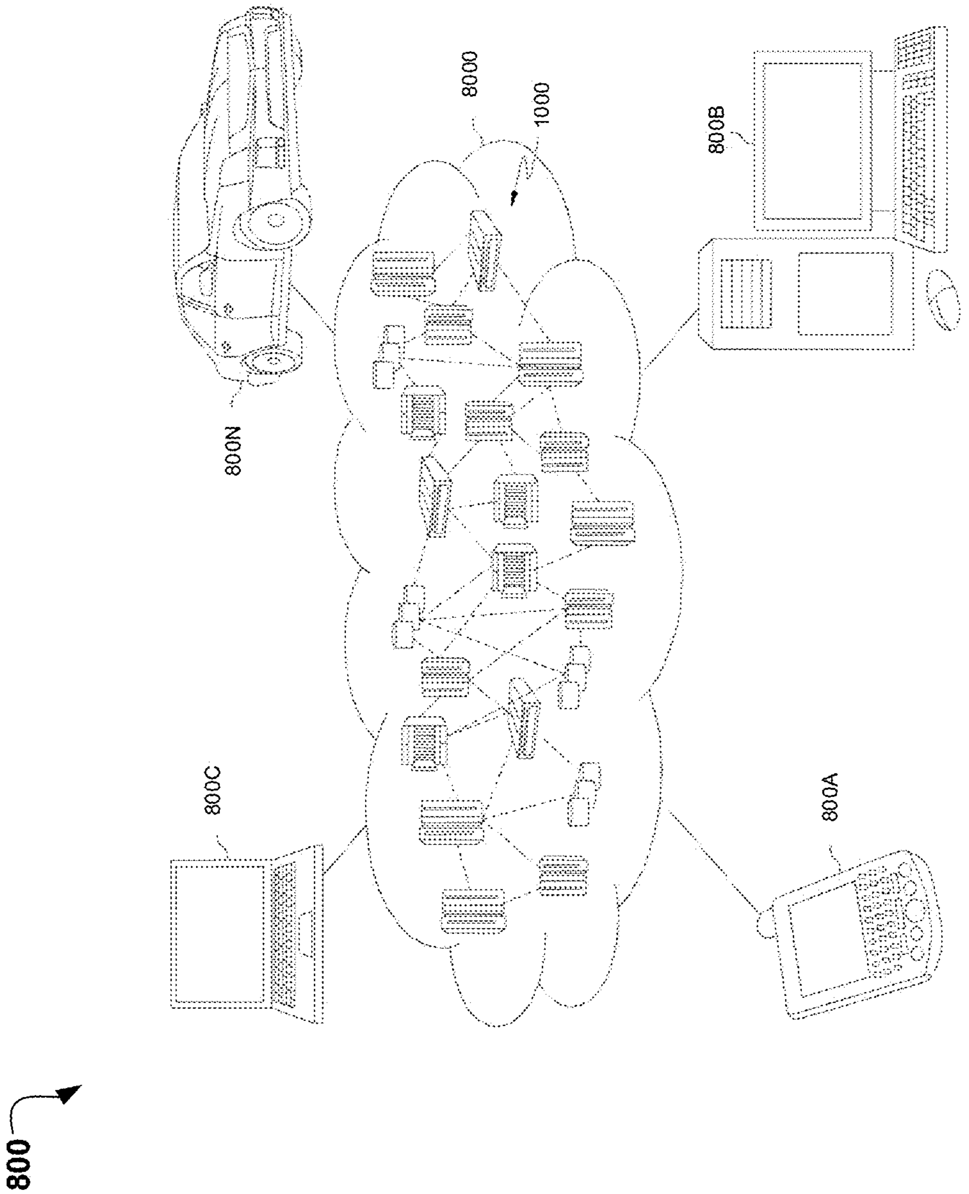
FIG. 8 is a block diagram of an illustrative cloud computing environment including the computer system depicted in FIG. 1, in accordance with an embodiment of the present disclosure.

Referring now to FIG. 8, illustrative cloud computing environment 800 is depicted. As shown, cloud computing environment 800 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 8000 to offer infrastructure, platforms and/or software as services for which a cloud consumer does not need to maintain resources on a local computing device. It is understood that the types of computing devices 800A-N shown in FIG. 8 are intended to be illustrative only and that computing nodes 100 and cloud computing environment 8000 can communicate with any type of computerized device over any type of network and/or network addressable connection (e.g., using a web browser).

Figure 9:
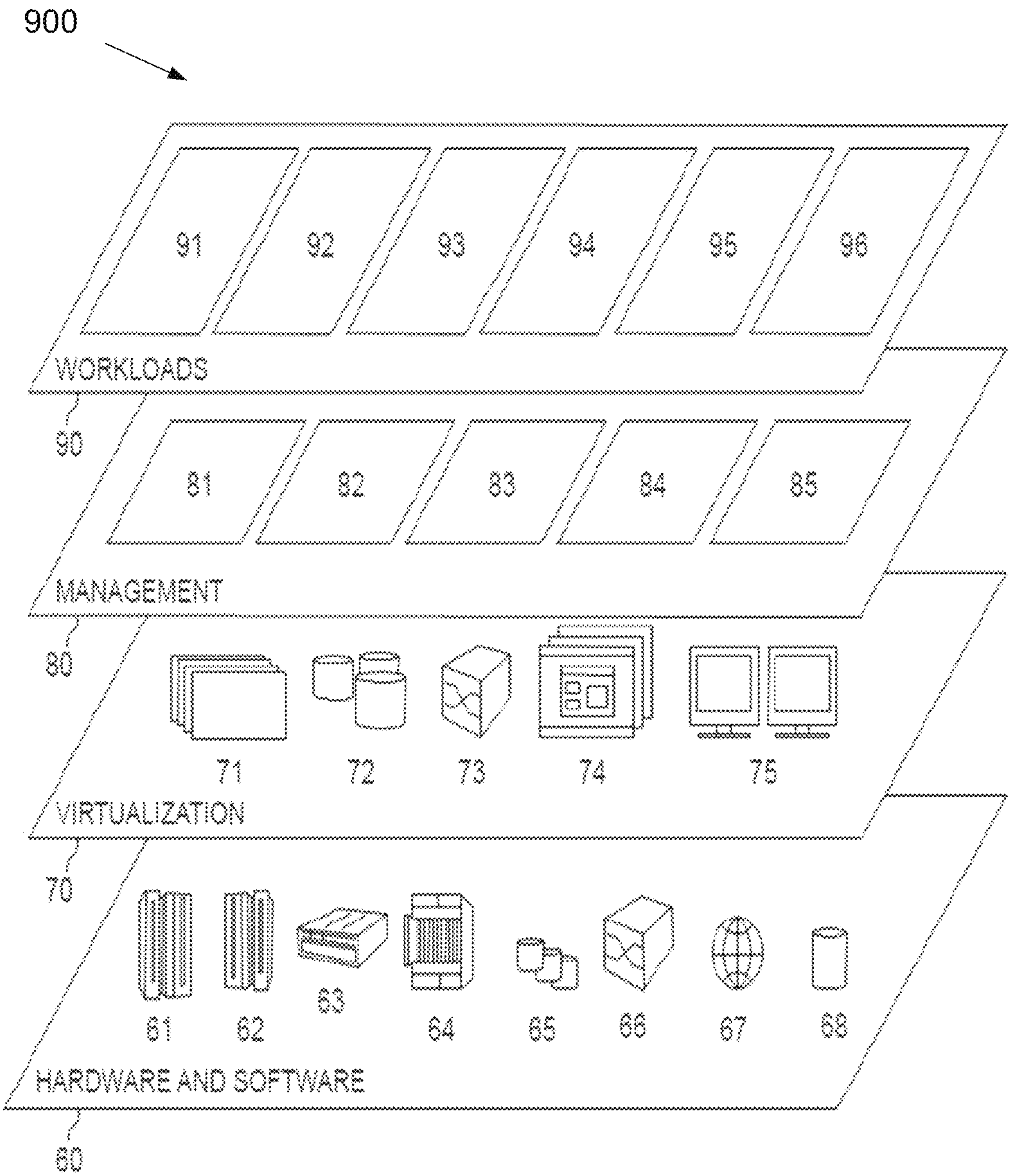
FIG. 9 is a block diagram of functional layers of the illustrative cloud computing environment of FIG. 8, in accordance with an embodiment of the present disclosure.

Referring now to FIG. 9, a set of functional abstraction layers 900 provided by cloud computing environment 800 (FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and UXaaS 96. A UXaaS program 108A, 108B (FIG. 1) may be offered "as a service in the cloud" (i.e., Software as a Service (SaaS)) for applications running on computing devices 102 (FIG. 1) and may automatically migrate a cloud-based solution onto a datacenter based on machine-learned user profile data and user experience.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically migrating a cloud-based solution onto a datacenter based on machine-learned user profile data and user experience data, comprising:

populating and maintaining a corpus of datacenters, wherein maintaining the corpus of datacenters further comprises detecting current and previous computing capabilities and performance of each datacenter in the corpus;

identifying different types of users using the cloud-based solution and generating a user profile for each type of user based on the machine-learned user profile data, wherein identifying the different types of users and generating the user profile based on the machine-learned user profile data further comprises automatically identifying a specific type of user and one or more types of computing tasks executed by the specific type of user, and associating the one or more types of computing tasks with the specific type of user and with a time in which the specific type of user executes the one or more types of computing tasks;

using a machine-learning algorithm to detect a user experience with the cloud-based solution on one or more datacenters from the corpus of datacenters for each type of user based on the machine-learned user experience data, wherein detecting the user experience based on the machine-learned user experience data further comprises detecting the one or more types of computing tasks being executed by the user on the cloud-based solution by the specific type of user and the performance of the one or more datacenters during execution of the one or more types of computing tasks, detecting clicks by the specific type of user on the cloud-based solution, detecting response times or an elapsed time for performing specific computing activities, latency issues, and buffering or lagging issues;

using the machine-learning algorithm to correlate, for the specific type of user and for the one or more types of computing tasks associated with the specific type of user, the machine-learned user profile data with the machine-learned user experience data and the current and previous computing capabilities and performance of each datacenter in the corpus; and automatically migrating the cloud-based solution onto the datacenter from the corpus of datacenters for the specific type of user based on the correlation between the machine-learned user profile data, the machine-learned user experience data, and the current and previous computing capabilities and performance of the datacenter, wherein the automatically migrating further comprises determining that the datacenter is equipped with a threshold amount of computing resources and capabilities for executing the one or more types of computing tasks associated with the specific type of user based on the correlation between the machine-learned user profile data, the machine-learned user experience data, and the current and previous computing capabilities and performance of the datacenter.

2. The method of claim 1, wherein automatically migrating the cloud-based solution further comprises:

automatically and preemptively selecting the datacenter and migrating the cloud-based solution onto the datacenter for the specific type of user.

3. The method of claim 1, wherein automatically migrating the cloud-based solution further comprises:

automatically migrating the cloud-based solution from a first datacenter to a second datacenter during real-time use of the cloud-based solution to provide an optimal user experience for the specific type of user.

4. The method of claim 1, wherein the machine-learned user profile data is selected from a group comprising at least one of user role data, user location data, datacenter preferences, typical computing activities performed data, typical times of performing the computing activities data, scheduled computing activities data, and user computing preferences.

5. The method of claim 1, wherein automatically migrating the cloud-based solution further comprises:

determining an overall score for the datacenter by scoring and summing different parts of data associated with the machine-learned user profile data and the machine-learned user experience data, and weighing one or more scores for the different parts of data differently.

6. The method of claim 5, further comprising:

receiving feedback to adjust the overall score and weight of the different parts of data.

7. A computer system for automatically migrating a cloud-based solution onto a datacenter based on machine-learned user profile data and user experience data, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

populating and maintaining a corpus of datacenters, wherein maintaining the corpus of datacenters further comprises detecting current and previous computing capabilities and performance of each datacenter in the corpus;

identifying different types of users using the cloud-based solution and generating a user profile for each type of user based on the machine-learned user profile data, wherein identifying the different types of users and generating the user profile based on the machine-learned user profile data further comprises automatically identifying a specific type of user and one or more types of computing tasks executed by the specific type of user, and associating the one or more types of computing tasks with the specific type of user and with a time in which the specific type of user executes the one or more types of computing tasks;

using a machine-learning algorithm to detect a user experience with the cloud- based solution on one or more datacenters from the corpus of datacenters for each type of user based on the machine-learned user experience data, wherein detecting the user experience based on the machine-learned user experience data further comprises detecting the one or more types of computing tasks being executed by the user on the cloud-based solution by the specific type of user and the performance of the one or more datacenters during execution of the one or more types of computing tasks, detecting clicks by the specific type of user on the cloud-based solution, detecting response times or an elapsed time for performing specific computing activities, latency issues, and buffering or lagging issues;

using the machine-learning algorithm to correlate, for the specific type of user and for the one or more types of computing tasks associated with the specific type of user, the machine-learned user profile data with the machine-learned user experience data and the current and previous computing capabilities and performance of each datacenter in the corpus; and automatically migrating the cloud-based solution onto the datacenter from the corpus of datacenters for the specific type of user based on the correlation between the machine-learned user profile data, the machine-learned user experience data, and the current and previous computing capabilities and performance of the datacenter, wherein the automatically migrating further comprises determining that the datacenter is equipped with a threshold amount of computing resources and capabilities for executing the one or more types of computing tasks associated with the specific type of user based on the correlation between the machine-learned user profile data, the machine-learned user experience data, and the current and previous computing capabilities and performance of the datacenter.

8. The computer system of claim 7, wherein automatically migrating the cloud-based solution further comprises:

automatically and preemptively selecting the datacenter and migrating the cloud-based solution onto the datacenter for the specific type of user.

9. The computer system of claim 7, wherein automatically migrating the cloud-based solution further comprises:

automatically migrating the cloud-based solution from a first datacenter to a second datacenter during real-time use of the cloud-based solution to provide an optimal user experience for the specific type of user.

10. The computer system of claim 7, wherein the machine-learned user profile data is selected from a group comprising at least one of user role data, user location data, datacenter preferences, typical computing activities performed data, typical times of performing the computing activities data, scheduled computing activities data, and user computing preferences.

11. The computer system of claim 7, wherein automatically migrating the cloud-based solution further comprises:

determining an overall score for the datacenter by scoring and summing different parts of data associated with the machine-learned user profile data and the machine-learned user experience data, and weighing one or more scores for the different parts of data differently.

12. The computer system of claim 11, further comprising:

receiving feedback to adjust the overall score and weight of the different parts of data.

13. A computer program product for automatically migrating a cloud-based solution onto a datacenter based on machine-learned user profile data and user experience data, comprising:

one or more tangible computer-readable storage devices and program instructions stored on at least one of the one or more tangible computer-readable storage devices, the program instructions executable by a processor, the program instructions comprising:

populating and maintaining a corpus of datacenters, wherein maintaining the corpus of datacenters further comprises detecting current and previous computing capabilities and performance of each datacenter in the corpus;

identifying different types of users using the cloud-based solution and generating a user profile for each type of user based on the machine-learned user profile data, wherein identifying the different types of users and generating the user profile based on the machine-learned user profile data further comprises automatically identifying a specific type of user and one or more types of computing tasks executed by the specific type of user, and associating the one or more types of computing tasks with the specific type of user and with a time in which the specific type of user executes the one or more types of computing tasks;

using a machine-learning algorithm to detect a user experience with the cloud- based solution on one or more datacenters from the corpus of datacenters for each type of user based on the machine-learned user experience data, wherein detecting the user experience based on the machine-learned user experience data further comprises detecting the one or more types of computing tasks being executed by the user on the cloud-based solution by the specific type of user and the performance of the one or more datacenters during execution of the one or more types of computing tasks, detecting clicks by the specific type of user on the cloud-based solution, detecting response times or an elapsed time for performing specific computing activities, latency issues, and buffering or lagging issues;

using the machine-learning algorithm to correlate, for the specific type of user and for the one or more types of computing tasks associated with the specific type of user, the machine-learned user profile data with the machine-learned user experience data and the current and previous computing capabilities and performance of each datacenter in the corpus; and automatically migrating the cloud-based solution onto the datacenter from the corpus of datacenters for the specific type of user based on the correlation between the machine-learned user profile data, the machine-learned user experience data, and the current and previous computing capabilities and performance of the datacenter, wherein the automatically migrating further comprises determining that the datacenter is equipped with a threshold amount of computing resources and capabilities for executing the one or more types of computing tasks associated with the specific type of user based on the correlation between the machine-learned user profile data, the machine-learned user experience data, and the current and previous computing capabilities and performance of the datacenter.

14. The computer program product of claim 13, wherein automatically migrating the cloud-based solution further comprises:

automatically and preemptively selecting the datacenter and migrating the cloud-based solution onto the datacenter for the specific type of user.

15. The computer program product of claim 13, wherein automatically migrating the cloud-based solution further comprises:

automatically migrating the cloud-based solution from a first datacenter to a second datacenter during real-time use of the cloud-based solution to provide an optimal user experience for the specific type of user.

16. The computer program product of claim 13, wherein the machine-learned user profile data is selected from a group comprising at least one of user role data, user location data, datacenter preferences, typical computing activities performed data, typical times of performing the computing activities data, scheduled computing activities data, and user computing preferences.

17. The computer program product of claim 13, wherein automatically migrating the cloud-based solution further comprises:

determining an overall score for the datacenter by scoring and summing different parts of data associated with the machine-learned user profile data and the machine-learned user experience data, and weighing one or more scores for the different parts of data differently.

* * * * *